United States Patent [19]
Ramsey

[11] Patent Number: 5,591,979
[45] Date of Patent: Jan. 7, 1997

[54] DEVICE AND METHOD FOR SECURING AN ELECTRET IN A RADON GAS DETECTOR

[75] Inventor: Robert W. Ramsey, Woodsboro, Md.

[73] Assignee: Radon Testing Corporation of America, Irvington, N.Y.

[21] Appl. No.: 311,546

[22] Filed: Sep. 23, 1994

Related U.S. Application Data

[63] Continuation-in-part of Ser. No. 26,851, Jan. 12, 1994, abandoned, which is a continuation of Ser. No. 10,579, Jul. 12, 1993, abandoned.

[51] Int. Cl.$^6$ ..................................................... G01T 1/14
[52] U.S. Cl. ........................... 250/383; 160/380; 160/395; 250/DIG. 2
[58] Field of Search .................................. 160/380, 395; 250/DIG. 2, 383

[56] References Cited

U.S. PATENT DOCUMENTS

| 4,170,810 | 10/1979 | Peleg | 160/395 |
|---|---|---|---|
| 5,093,570 | 3/1992 | Dorfi et al. | 250/253 |

FOREIGN PATENT DOCUMENTS

| 39075/72 | 8/1973 | Australia. | |
|---|---|---|---|
| 0472762 | 3/1992 | European Pat. Off.. | |
| 237721 | 7/1986 | German Dem. Rep.. | |
| 1165725 | 10/1969 | United Kingdom | 160/395 |

OTHER PUBLICATIONS

Miscellaneous Advertisements from Rad Elec Inc. (no dates available).

Primary Examiner—Constantine Hannaher
Attorney, Agent, or Firm—Darby & Darby, P.C.

[57] ABSTRACT

A device and method for locating an electret in an electret-type radon gas detector, so it is wrinkle free, uses a sloped pedestal over which the electret sheet is placed. A ring with a beveled interior surface and a minor diameter smaller than the top of the pedestal is forced down over the electret sheet and pedestal, and into a groove surrounding the pedestal formed by a wall projecting from the base of the device. The movement of the ring causes the electret to stretch and eliminates any wrinkles. Also, forcing the ring over the pedestal causes the ring to rotate about its circular centroid axis and to dig into the walls of the groove, thus locking the assembly together.

12 Claims, 3 Drawing Sheets

FIG. 5
FIG. 6A
FIG. 6B
FIG. 6C
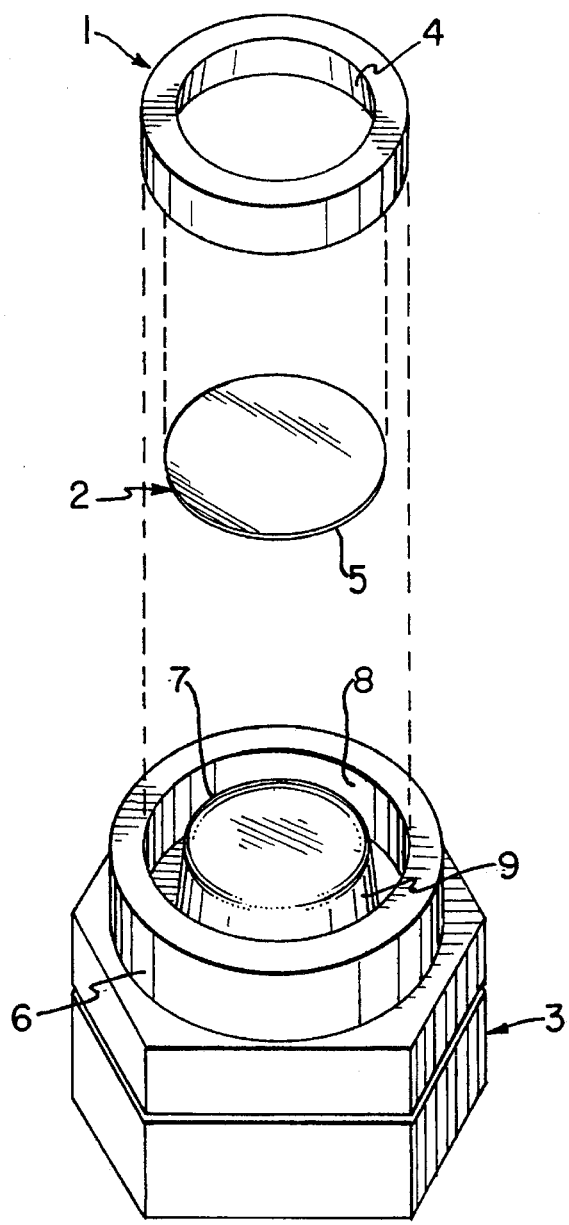
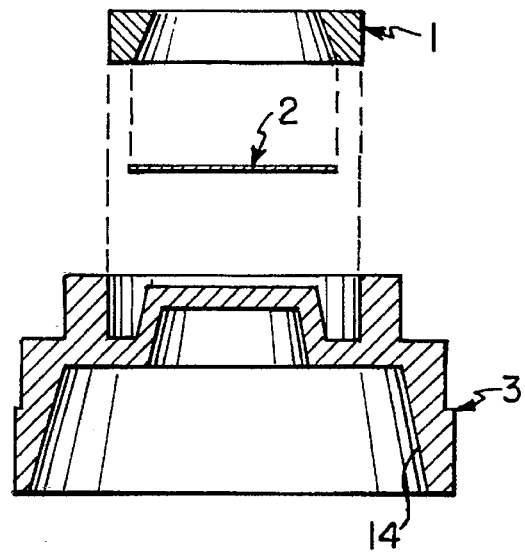
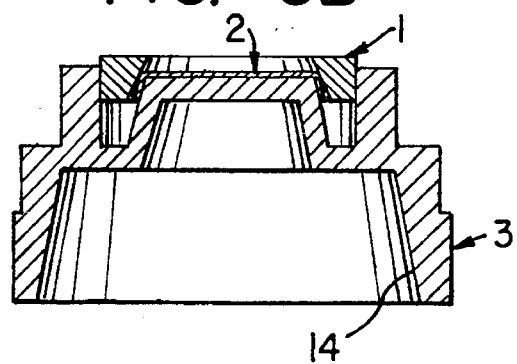
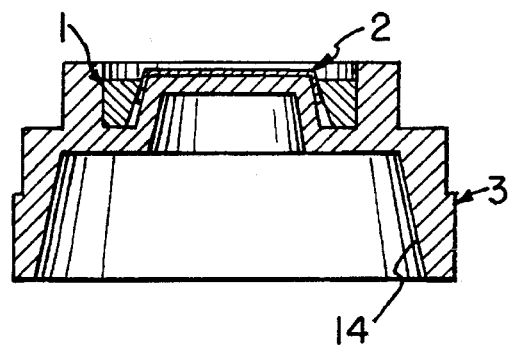

DEVICE AND METHOD FOR SECURING AN ELECTRET IN A RADON GAS DETECTOR

This is a continuation-in-part of application Ser. No. 29/026,851 filed Jan. 12, 1994, now abandoned which in turn is a continuation of application Ser. No. 29/010,579 filed Jul. 12, 1993 for ELECTRET HOLDER (now abandoned).

The present invention relates to a method of forming and retaining the electret film component of a radon gas detector in its position over the round-edged circular feature of the electret base.

BACKGROUND OF THE INVENTION

Radon is a radioactive gas that is found in natural rock formations. It usually passes harmlessly from cracks in the rock formation into the atmosphere and is dissipated. However, if a structure is built over the formation, the gas can accumulate in the basement. High concentrations of radon gas have been determined to be a health hazard.

Because of the potential hazard from radon gas, inspections of property for the presence of this gas are conducted both to determine if action is needed to protect the occupants or to determine the condition of the building prior to a sale. One method of conducting the inspection is to place previously sealed canisters with charcoal inside them in locations were radon gas is likely to accumulate. The canisters are unsealed so the gas or its by-products can enter the canister and become trapped in the charcoal. After about three days the canisters are collected, resealed and sent to a laboratory where the radioactivity of the charcoal is measured. This measurement is an indication of the presence and concentration of the gas.

Another method of testing for radon gas involves the use of electrets, e.g. Teflon®. With this method the electret in the form of a film is mounted on a pedestal in a sealable container, the walls of which are conductive. The electret has been electrically charged, e.g., to about 700 volts. If this charged electret is placed in the presence of radon gas, ions created by the radioactivity of the radon or its radioactive by-products cancel the charge on the electret surface. As a result, the average voltage from the electret charge on the electret is decreased.

If a charged electret in its container is left exposed in a location where radon gas is expected, the electret will undergo Loss of Voltage and the container in which it is fixed can subsequently be sealed and the container shipped to a laboratory. The laboratory measures the difference between the voltage before exposure and the voltage after the container was sealed. The voltage difference is an indication of the concentration of radon gas in the location.

The structure of an electret radon gas detector is described in U.S. Pat. No. 5,093,570 of Dorfi et al., which is assigned to the assignee of the present application. This patent shows the electret film mounted on a pedestal. However, it has been found in practice that it is difficult to mount the electret, which is a flexible film, in a taut fashion without wrinkles. Wrinkles and misalignment of the electret film can lead to inaccurate results.

SUMMARY OF THE INVENTION

The present invention is directed to a means for wrinkle-free mounting of a flexible electret film in a radon gas detector through the use of a properly contoured pedestal in conjunction with a beveled mounting ring.

In an illustrative embodiment of the invention a ring component is provided which fits in a circular groove surrounding the electret pedestal. The ring component fits tightly into the outer edge of the groove. In cross section the inner diameter of both the groove and the ring are beveled. The minor diameter of the ring fits tightly against the electret pedestal when the ring is placed in the groove surrounding the electret pedestal. The major diameter of the ring provides a substantial clearance to the pedestal at the bottom of the groove due to the steeper taper of the pedestal.

Further, when the electret film is placed over the pedestal, its thickness establishes an interference fit when the retaining ring is forced to the bottom of the circular groove. The diameter of the top edge of the ring is now rendered substantially smaller than the diameter of the top of the pedestal so it engages the electret film and holds it in place. As the ring is pushed down into the groove, this interference has the effect of distorting the retaining ring in such manner that it is slightly rotated about its toroidal or circular centroid axis. This rotation simultaneously continues the rim force on the electret film and causes the outer top edge of the retaining ring to rotate and create circumferential pressure on the outer wall of the groove of the electret base. These combined forces set up a ratchet effect between the materials that tends to lock the ring in place and create a permanent assembly of the components.

BRIEF DESCRIPTION OF THE DRAWINGS

The foregoing and other features of the present invention will be more readily apparent from the following detailed description and drawings of an illustrative embodiment of the invention in which:

FIG. 5 is an exploded view of the electret holder of FIGS. 1–4 with the cover removed;

FIG. 6A–6C illustrate cross-sectional views of the assembly of the components of the detector of FIG. 5;

DESCRIPTION OF AN ILLUSTRATIVE EMBODIMENT

Figure 1:
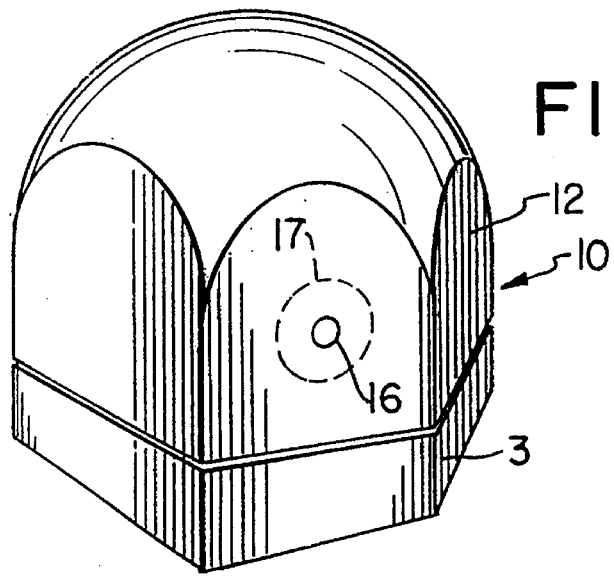
FIGS. 1–4 are perspective, elevation, top plan and bottom plan views of the exterior of an electret holder.
Figure 2:
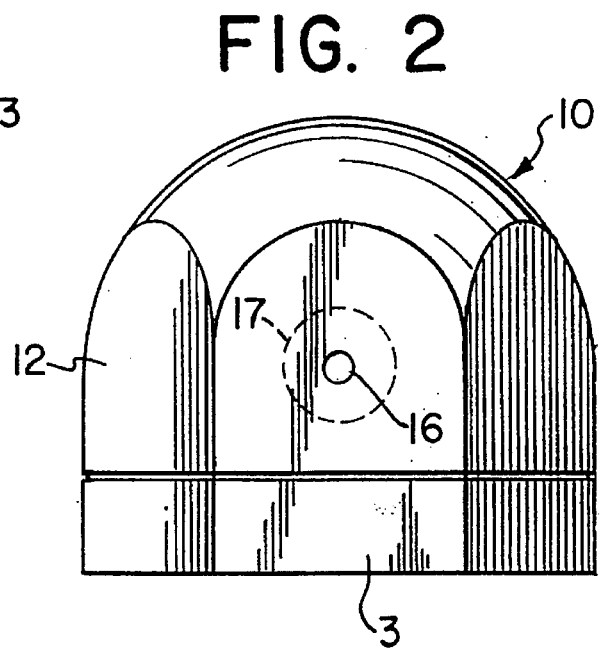
Figure 3:
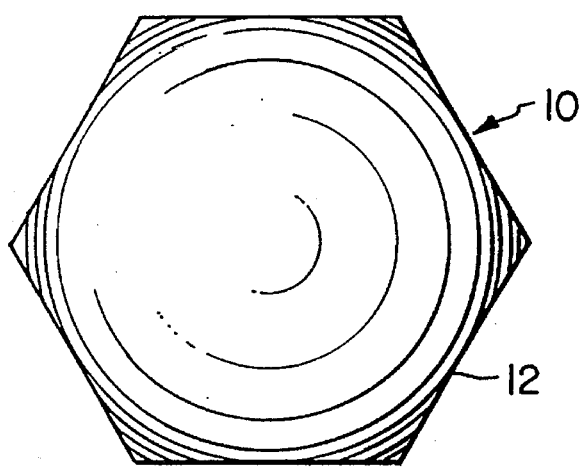
Figure 4:
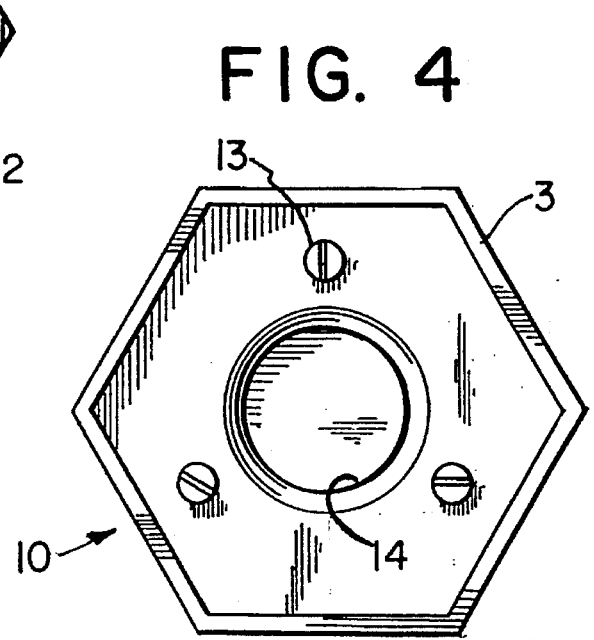

This invention responds to the need to hold a flexible electret film, i.e. a dielectric sheet having one side coated with a conductive layer, in such a manner that it will form a stable electret assembly suitable for installation in ionization collection type radiation measurement devices.

FIGS. 1–4 show a perspective, elevation, top and bottom view of an electret device 10 suitable for measuring the concentration of radon gas in a location. The device 10 has a base 3 and a dome-shaped cap 12 that is force fit onto an extension of the base. Both the base and cap are conductive plastic material. The bottom of the device 10 (FIG. 4) has a cavity 14 which defines a pedestal in its interior on which the electret is mounted. One or more openings 16 are provided in the cover to allow the selective entry of radon by diffusion to the exclosion of dust or particulate radioactivity in the air by a diffusion window or filter 17. This opening is covered with a sealing adhesive film when not undergoing sampling deployment.

Referring to FIG. 5, three components make up the design of the interior electret assembly. These are the base 3, which is an injection molded part made of an electrically conductive resin, the electret disk 2, which is made of a high dielectric composition resin such as Teflon® (DuPont), one side 5 of which has been coated with a metal or other conductive layer, and a retaining ring 1, which is also injection molded of electrically conductive resin. The design arrangement of these components is depicted in FIG. 5.

The electret disk 2 rests on the base component 3 with the electrically conductive coating 5 in contact with the raised circular electret mounting surface or pedestal 7 which projects from a surface 15 of the base 3. The base 3 also has a ring-shaped feature or wall 6 which projects from base surface 15 and surrounds the pedestal 7. The space between the pedestal and the feature 6 forms a groove 8 which is designed to receive the retaining ring 1. The inside diameter of the retaining ring 1 at the top side of the ring is smaller than the diameter at the top of the pedestal, and therefore holds the electret disk 2 to the pedestal 7 (see FIG. 6B). Note that the diameter of the ring at its bottom side may be greater than the diameter of the pedestal 7 at both its top and bottom side.

The unique feature of the arrangement is that, due to the shape of the pedestal 7, the retaining ring 1 and the outer ring-shaped feature 6 forming the groove 8, when they are forced together by an axial pressure delivered to the retaining ring 1, the ring distorts in such a manner as to wedge the ring 1 into the groove 8 so it stretches the disk 2 to remove wrinkles and permanently retains the assembly in place, thus securing the electret disk 2 to the base 3. The sequence of assembly is depicted in FIGS. 6A–6C.

Figure 7A:
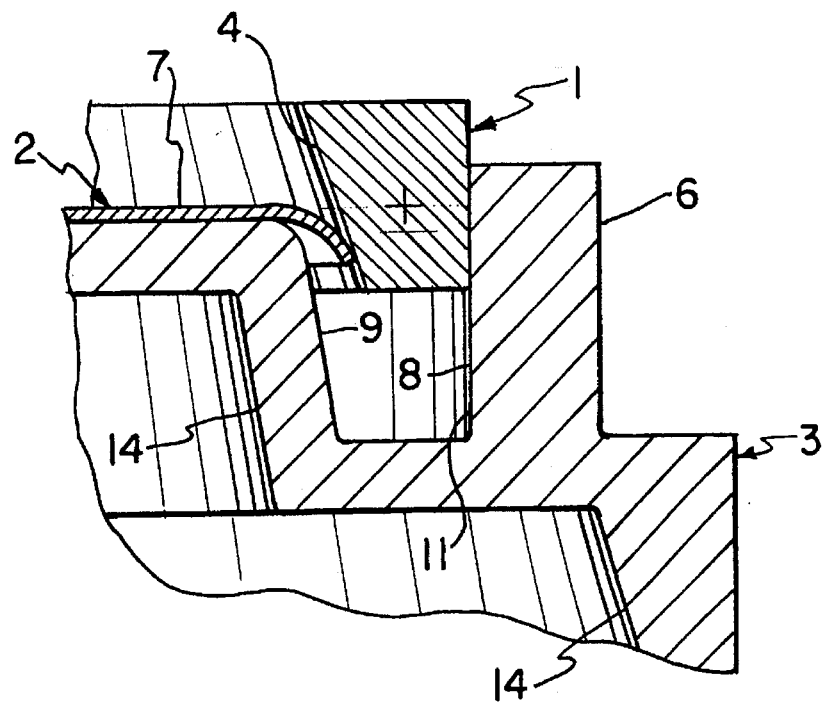
FIG. 7A shows an enlarged cross-sectional view of the pedestal groove and the undistorted retaining ring component.

The disk or sheet of flexible electret material 2 is located between the ring 1 and the feature within the groove 8 (FIG. 6A). The ring 1 is then forced down on the pedestal 7. In so doing, the disk 2 is contacted by the ring 1 and held tightly against the pedestal 7 because the inner diameter of the ring at its top (i.e. the minor diameter of the interior surface of the ring) is smaller than the top of the pedestal (FIG. 6B). Further, pressure downward on the ring causes it to attempt to stretch the flexible disk 2 over the pedestal, thus removing wrinkles in the disk. Because of the relative flexibility of the ring and its bevel or wedge shape compared to the shape of the pedestal and the groove 1 (as shown in detail in FIG. 7A), the ring rotates about its longitudinal toroidal or circumferential axis in the direction shown by the arrow in FIG. 7B. This causes the ring to wedge in place in the groove 8, thereby locking the disk 2 in place so it has no wrinkles. This locking in place may be performed without adhesives or other fastening means. Nevertheless, if desired adhesives or thermal fusion may be used between the disk and pedestal as additional features of assembly but they may have to be conductive adhesives.

Figure 7B:
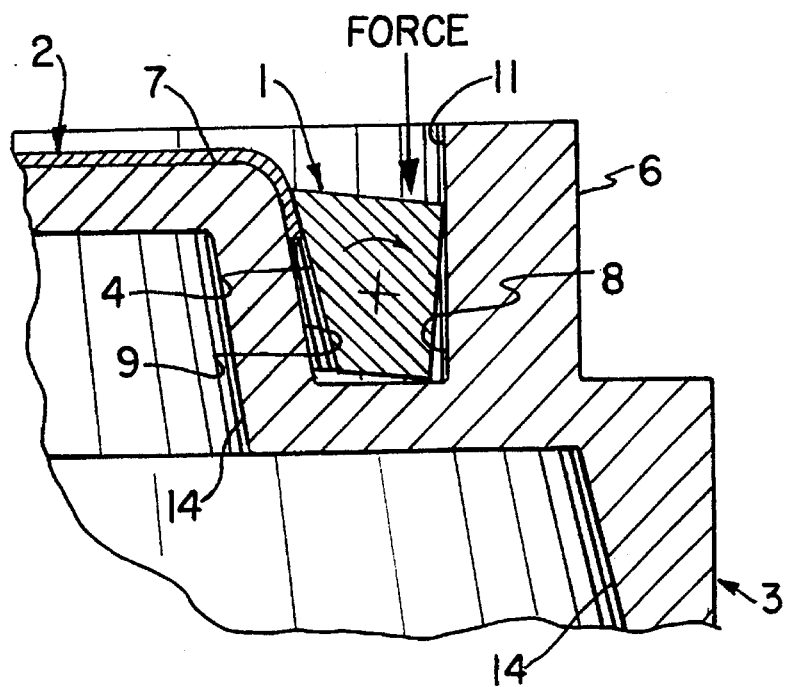
FIG. 7B shows the cross-sectional view of the pedestal groove and the ring rotated about the toroidal axis to lock it in place.

The manner of the wedge action and the forced rotation of the retaining ring 1 about its toroid or circular centroid axis is depicted in FIG. 7B. The ring 1 has an interior surface 4 with a minor diameter at its top, as shown in FIG. 7C, and a major diameter at its bottom. The groove 8 also has an inner surface 9 as defined by the pedestal 7 with a minor diameter at the top of the pedestal and a major diameter at the bottom of the pedestal. Since wall 9 has a steeper slope than wall 4, the difference between the major and minor diameters of wall 4 is greater than the difference between the major and minor diameter of wall 9. This difference contributes to the rotation of the ring 1 during insertion and its locking in place. The contact forces on the ring, due to its contact with the electret pedestal 7, causes the ring 1 to twist and distort in a manner that increases its effective diameter at the top and causes it to dig into the inner wall 11 of the groove-forming circular feature 6 of the base 3. The wedge force is unrelaxed when the assembly fixture pressure is removed and the electret remains locked in place. In addition the retention of the ring can be further secured by thermal melting or adhesive application at the point of interference.

The potential use of this method of assembly includes, in addition to this application, the securing of closure or tamper seals to containers without the use of glues or thermal processing, the installation of rupture disks to pressure containers, the assembly of rotating parts to shafts or hubs and many configurations of assembly of cylindrical components to one another with permanent mechanical retention of the assembly forces.

The raised electret positioning, caused by the emergence of the pedestal proud of the retaining ring (see FIG. 7B) results in a superior uniformity of the electric field at the margin of its circumferential frame.

While the invention has been particularly shown and described with reference to a preferred embodiment thereof, it will be understood by those skilled in the art that various changes in form and details may be made therein without departing from the spirit and scope of the invention.

What is claimed is:

1. An assembly for mounting a flexible sheet on a raised pedestal with a top and bottom comprising:

an annular shaped wall surrounding the pedestal so as to form an annular groove about the pedestal; and a ring with a beveled interior surface so that the interior surface has a minor diameter at one side of the ring and a major diameter at the other side, the minor diameter being smaller than the diameter of the pedestal at its top, said ring being flexible so that it is capable of rotating about its axis, said ring being force fit over the sheet on the pedestal so as to stretch the sheet to remove wrinkles and being rotated to wedge in the groove.

2. The assembly of claim 1 wherein the flexible sheet is an electret used for measuring concentrations of radon gas.

3. The assembly of claim 1 wherein the groove has an inner wall defined by the pedestal that is bevel shaped so that the inner wall has a minor diameter at the top of the pedestal and a major diameter at the bottom of the pedestal.

4. The assembly of claim 3 wherein the difference between the major and minor diameters of the ring is larger than the difference between the major and minor diameters of the inner wall of the groove.

5. The assembly of claim 1 where the ring rotates about its circular centroid axis.

6. A radon concentration measurement device, comprising:

a base having a raised pedestal projecting from a surface thereof, said pedestal having a top and bottom;

an annular shaped wall projecting from said base surface at a distance from said pedestal and surrounding said pedestal, said wall and pedestal forming an annular groove about said pedestal;

a flexible sheet of electret material located on the top of the pedestal and extending a small distance into the groove; and a ring with a beveled interior surface press fit into the groove over the sheet, the internal surface of said ring having a minor diameter at one side of the ring which is smaller than the diameter of the pedestal at its top, said ring being flexible and being rotated about its circumferential axis from its rest position as a result of being pressed over the flexible sheet and into the groove.

7. The device of claim 6 wherein the groove has an inner wall defined by the pedestal that is bevel shaped so that the inner wall has a minor diameter at the top of the pedestal and a major diameter at the bottom of the pedestal.

8. The device of claim 7 wherein the difference between the major and minor diameters of the ring is larger than the difference between the major and minor diameters of the inner wall of the groove.

9. The device of claim 6 wherein the ring rotates about its circular centroid axis.

10. The device of claim 6 further including a dome cap force fit on an outer surface of said wall and extending over the pedestal, electret and ring to form an ionization chamber.

11. A method of retaining a flexible sheet on a raised pedestal, comprising the steps of:

locating the sheet over the top of the pedestal;

providing an annular groove surrounding the pedestal;

placing a ring with a beveled interior surface and a diameter less than the top of the pedestal over the sheet on the pedestal; and forcing the ring down on the sheet and pedestal so that the sheet is stretched to remove wrinkles and the ring is caused to rotate about its circumferential axis and to wedge into the groove.

12. A method as in claim 11 wherein the sheet is an electret used for measuring a concentration of radon gas.

* * * * *